United States Patent
Taimela et al.

(10) Patent No.: US 11,362,519 B2
(45) Date of Patent: Jun. 14, 2022

(54) APPARATUS AND METHODS FOR SOFT GRID INTERCONNECTION OF DISTRIBUTED GENERATION ASSETS

(71) Applicant: Flexgen Power Systems, Inc., Durham, NC (US)

(72) Inventors: Pasi Taimela, Wake Forest, NC (US); Robert William Johnson, Jr., Raleigh, NC (US)

(73) Assignee: Flexgen Power Systems, Inc., Durham, NC (US)

( * ) Notice: Subject to any disclaimer, the term of this patent is extended or adjusted under 35 U.S.C. 154(b) by 0 days.

(21) Appl. No.: 17/048,461

(22) PCT Filed: Apr. 12, 2019

(86) PCT No.: PCT/US2019/027176
§ 371 (c)(1),
(2) Date: Oct. 16, 2020

(87) PCT Pub. No.: WO2019/204138
PCT Pub. Date: Oct. 24, 2019

(65) Prior Publication Data
US 2021/0083482 A1   Mar. 18, 2021

Related U.S. Application Data

(60) Provisional application No. 62/659,889, filed on Apr. 19, 2018.

(51) Int. Cl.
*H02J 3/38* (2006.01)
*H02J 3/32* (2006.01)
(Continued)

(52) U.S. Cl.
CPC ............ *H02J 3/381* (2013.01); *H02J 3/32* (2013.01); *H02J 3/40* (2013.01); *H02J 9/068* (2020.01)

(58) Field of Classification Search
CPC .... H02J 3/381; H02J 9/068; H02J 3/32; H02J 3/40; H02J 3/005
See application file for complete search history.

(56) References Cited

U.S. PATENT DOCUMENTS

| 6,134,124 A | 10/2000 | Jungreis |
| 10,199,858 B2 * | 2/2019 | Johnson, Jr. ............ H02J 9/062 |

(Continued)

OTHER PUBLICATIONS

International Preliminary Report on Patentability, PCT/US2019/027176, dated Oct. 29, 2020; 10 pages.
(Continued)

*Primary Examiner* — Toan T Vu
(74) *Attorney, Agent, or Firm* — Stanek Lemon Crouse & Meeks, P.A.

(57) ABSTRACT

A system includes a break-before-make automatic transfer switch (ATS) configured to selectively couple a utility grid and at least one distributed generator (e.g., a plurality of paralleled generators) to a load bus such that, in a state transition of the ATS, the utility grid and the at least one distributed generator are both disconnected from the load bus before the utility grid or the at least one distributed generator is connected to the load bus. The system further includes at least one converter configured to be coupled to the load bus and configured to provide power to the load bus during the state transition of the ATS.

14 Claims, 8 Drawing Sheets

(51) Int. Cl.
*H02J 3/40* (2006.01)
*H02J 9/06* (2006.01)

(56) References Cited

U.S. PATENT DOCUMENTS

| | | | | |
|---|---|---|---|---|
| 2003/0048004 A1* | 3/2003 | Fleming | .................. | H02J 3/007 |
| | | | | 307/64 |
| 2008/0203820 A1 | 8/2008 | Kramer et al. | | |
| 2011/0208370 A1* | 8/2011 | Lee | .......................... | H02J 9/062 |
| | | | | 700/297 |
| 2011/0291479 A1* | 12/2011 | Lee | .......................... | H02J 3/32 |
| | | | | 307/43 |
| 2015/0340864 A1 | 11/2015 | Compton | | |
| 2016/0359361 A1* | 12/2016 | Tiwari | ..................... | H02J 11/00 |

OTHER PUBLICATIONS

International Search Report and Written Opinion, PCT/US2019/027176, dated Jul. 23, 2019; 16 pages.
Communication pursuant to Rule 164(2)(b) and Article 94(3) EPC, EP 19 720 271.6, dated Mar. 31, 2022, 9 pages.

\* cited by examiner

APPARATUS AND METHODS FOR SOFT GRID INTERCONNECTION OF DISTRIBUTED GENERATION ASSETS

BACKGROUND

Embodiments of the inventive subject matter relate to electric power systems and, more particularly, to power grids utilizing distributed generators.

During the last several years, there has been a fast-developing trend to transform the grid energy production from central power stations to production using assets that are more distributed generation in nature. Fast growth of wind, solar, grid-tied energy storage and flexible power generation plants is creating anew grid interconnect dilemma.

Traditional utilities used central power stations and were built as a generally unidirectional grid. In a unidirectional grid, protective devices (breakers, fuses, etc.) capable of handling and interrupting high currents were installed upstream only. Moving downstream from the central power stations, available fault currents were reduced, and less robust protective devices were required.

In this traditional utility distribution system, only the load was downstream from the central power station. Therefore, the grid was built such that, each step of the way with lower voltages and higher impedance closer to consumer. Therefore, the last leg of power distribution grid did not require expensive, high current capable infrastructure. The capability of a protective device is rated by its ability to safely interrupt fault currents and is expressed in Amperes Interrupting Capacity (AIC).

The addition of distributed generation (DG) close to the last legs of the existing distribution grid may change fault current dynamics of the grid. With the addition of a new generation station, we can have higher than expected fault currents, which may compromise the safety of the system. The higher fault current may render the existing circuit protection devices ineffective in isolating a fault on the revised grid. With the increasing use of distributed generation, the grid may need to be more symmetrical, with high current capability interruption and protections at both ends of the system. This may require the utility to evaluate the grid and make upgrades for higher fault current capability close to the load when adding distributed generation.

Changes to the existing grid can be costly and time consuming. Once the changes have been identified, there may also be contention over who should fund the infrastructure upgrade. The utilities have tended to delay identity these changes, resulting in long approval delays. They also tend to assess high grid interconnect fees to the distributed power generation developers to cover the infrastructure changes. The delays and high fees can make a proposed distributed power generation project unprofitable and a non-starter.

SUMMARY

Some embodiments of the inventive subject matter provide a system including a break-before-make automatic transfer switch (ATS) configured to selectively couple a utility grid and at least one distributed generator (e.g., a plurality of paralleled generators) to a load bus such that, in a state transition of the ATS, the utility grid and the at least one distributed generator are both disconnected from the load bus before the utility grid or the at least one distributed generator is connected to the load bus. The system further includes at least one converter configured to be coupled to the load bus and configured to provide power to the load bus during the state transition of the ATS. In some embodiments, the at least one converter may be configured to provide power to the load bus from the utility grid during the state transition of the ATS. In some embodiments, the at least one converter may include a first converter having a first port configured to be coupled to the utility grid and a second converter having a first port coupled to a second port of the first converter by a DC bus and a second port configured to be coupled to the load bus. In some embodiments, the at least one converter may be bidirectional and support transfer of power from the at least one distributed generator to the utility grid.

In some embodiments, the at least one converter may be configured to commence providing power to the load bus before the state transition when the utility grid is connected to e load bus via the ATS, to continue providing power to the load bus through the state transition, and to gradually cease providing power to the load bus after the state transition when the at least one distributed generator is connected to the load bus via the ATS. The at least one convener may be further configured to provide power to the load responsive to an unavailability of the at least one distributed generator after the state transition.

In further embodiments, the at least one converter may be configured to commence providing power to the load bus before the state transition while the at least one distributed generator is connected to the load bus via the ATS, to continue providing power to the load bus through the state transition, and to gradually cease providing power to the load bus after the state transition when the utility grid is connected to the load bus via the ATS.

Additional embodiments provide a system including at least one distributed generator, a switch configured to connect the at least one generator to a load bus, and a converter coupled between a utility grid and the load bus and configured to provide power to the load bus from the utility grid while the at least one distributed generator is connected to the load bus and providing power thereto.

Still further embodiments provide a system including a first switch configured to couple a utility grid to a load bus via an inductor, a second switch configured to be coupled at least one distributed generator to the load bus, and at least one converter configured to be coupled to the load bus and configured to provide power thereto to support a first mode in which the first and second switches are closed, a second mode in which the first switch is open and the second switch is closed and a third mode in which the first switch is closed and the second switch is open. The at least one convertor may be configured to support bidirectional power transfers between the utility grid and the load bus in the first mode. The at least one converter may be configured to provide voltage and transient load response support in the second and third modes.

DETAILED DESCRIPTION

Figure 1:
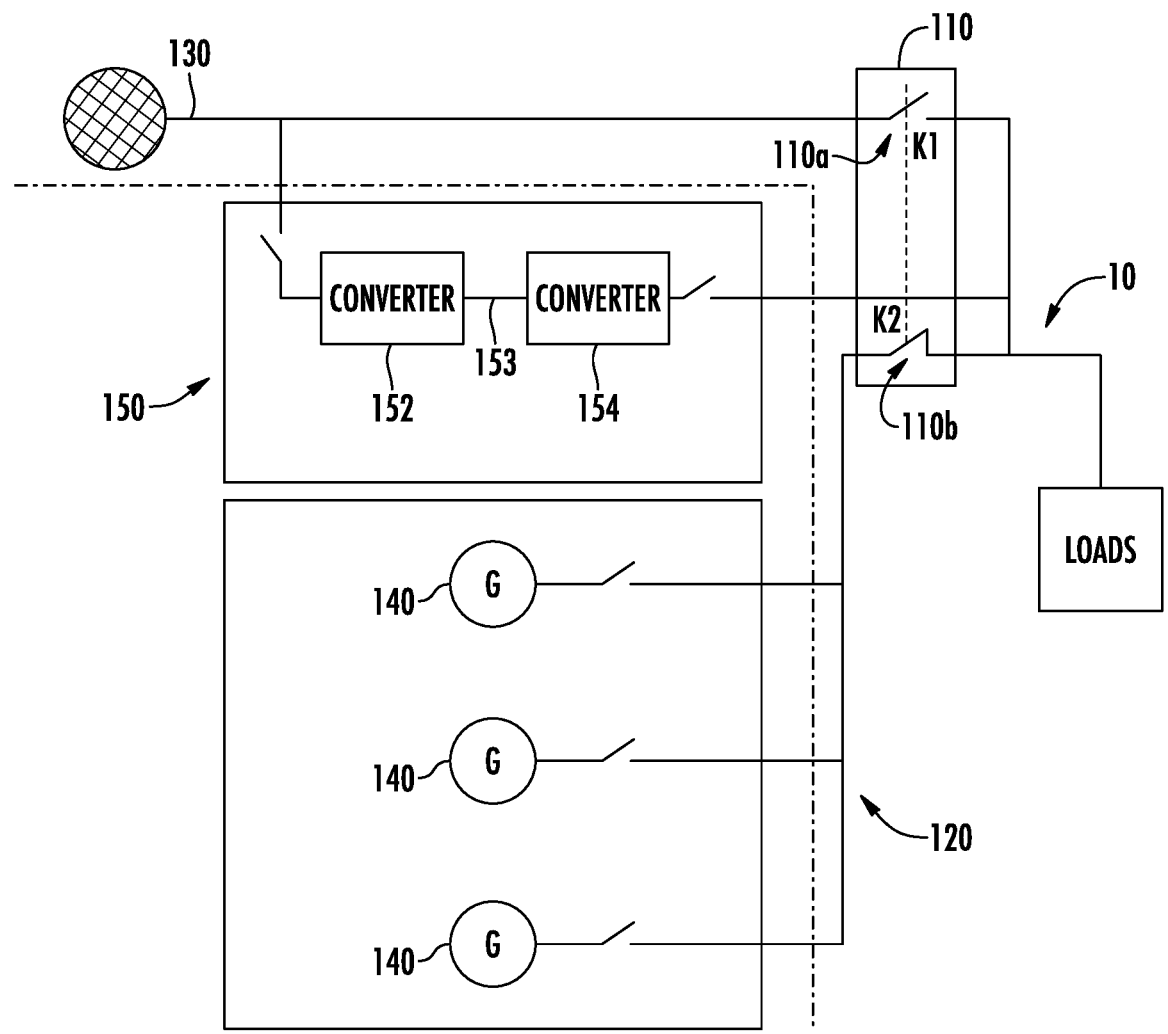
FIG. 1 is a schematic diagram illustrating a soft grid interconnection system according to some embodiments.

Specific exemplary embodiments of the inventive subject matter will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like items. It will be understood that when an item is referred to as being "connected" or "coupled" to another item, it can be directly connected or coupled to the other item or intervening items may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, items, and/or components, but do not preclude the presence or addition of one or more other features, integers, steps, operations, items, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Some embodiments of the inventive subject matter can provide a workable solution to the above-mentioned challenges by removing the need for grid side substation upgrades as a result of building a new distributed power generation project. Some embodiments of the inventive subject matter can achieve the following objectives to reduce or eliminate negative impacts to the existing grid: 1) DG power plant incoming power line short circuit current rating (AIC) does not significantly increase compared to the original installation capability before installing the (DG) device; 2) a symmetrical uninterrupted transfer capability is provided between grid mode and DG mode (meet base line power quality, such as ITIC-CBEMA, if desired.); 3) the cost of the "soft" transfer described provides an economically feasible business case for the distributed power generation project vs. paying grid infrastructure upgrades or high variable energy rates; and/or 4) the up time of proposed solution meets and exceeds the grid power availability.

As distributed generation is installed downstream in the existing grid at a distance from the central power station generation, there is a concern that fault currents will exceed the interruption current levels of local protection devices. As a result, the utility companies commonly require prolonged evaluations of the grid in the vicinity of the proposed connection to the grid. The result of the evaluation is most likely to include grid infrastructure upgrades before the distributed generation can be connected to the grid. Once the grid infrastructure upgrades have been identified, the cost is typically passed to the distributed generation developers in the form of high grid interconnect fees.

Some embodiments of the inventive subject matter provide methods and systems for integrating distributed generation (DG) to an existing grid without the need for grid infrastructure upgrades and without unduly increasing the distributed generation power line short circuit current rating (AIC) compared to the original installation.

Referring to FIG. 1, a grid 130 is connected to a load bus 10 through a first pole 110a of a break-before-make Automatic Transfer Switch (ATS) 110 of a soft grid connection system. The soft grid connection system further includes a solid state generator (SSG) power system 150 having first and second bidirectional converters 152, 154 coupled via DC link 153. The input of the soft grid connection system is connected to the grid 130 via the first converter 152 and the output is connected to the load bus 10 via the second converter 154. Distributed generation (DG) assets 140 are coupled to a common line 120 and to the load bus 10 through a second pole 110b of the break-before-make ATS 110.

In a first mode where the first pole 110a of the ATS 110 is open and the second pole 110b of the ATS is closed, the DG power plant 140 is operating and is supporting the load. To obtain a seamless transfer from the DG 140 to grid 130 with a break-before-make, the soft grid connection system takes power from the grid 130 and supplies it to the load bus 10. Once the load is supported by the grid 130 through the SSG system 150 of the soft grid connection system, the ATS 110 is commanded to transition to a state in which the second pole 110b of the ATS 110 is open and then the first pole 110a of the ATS 110 is closed. During the transition, the first and second poles 110a, 110b are both open, thus preventing parallel connection of the grid 130 and the DG 140, while the SSG system 150 provides power to the load bus 10. After the transfer, the SSG power system 150 ramps down its power output and allows the grid 130 to supply the load directly.

When the load bus 10 is being powered by the grid 130, the soft grid connection system starts delivering power to the load bus 10 from the grid 130. The DG assets 140 are synchronized with the load bus 10 but not connected. The ATS 110 is commanded to transfer from the grid 130 to the DG assets 140 and responds by opening the first pole 110a of the ATS 110 and then closing the second pole 110b of the ATS 110. The soft grid connection system will supply the load bus 10 from the grid 130 during the ATS transfer time. After the transfer is complete, the soft grid connection system reduces the power supplied by the grid 130 and support of the load is transferred slowly to the DG assets 140 until the load bus 10 is completely supported by the DG assets 140. In this case, the DG assets 140 are never connected to the grid 130 in a directly coupled parallel configuration. In the event of a loss of part of the DG assets 140, the soft grid connection system can supplement the DG assets 140 with power from the grid 130 without any direct connection between the grid 130 and DG assets common line 120.

Figure 6:
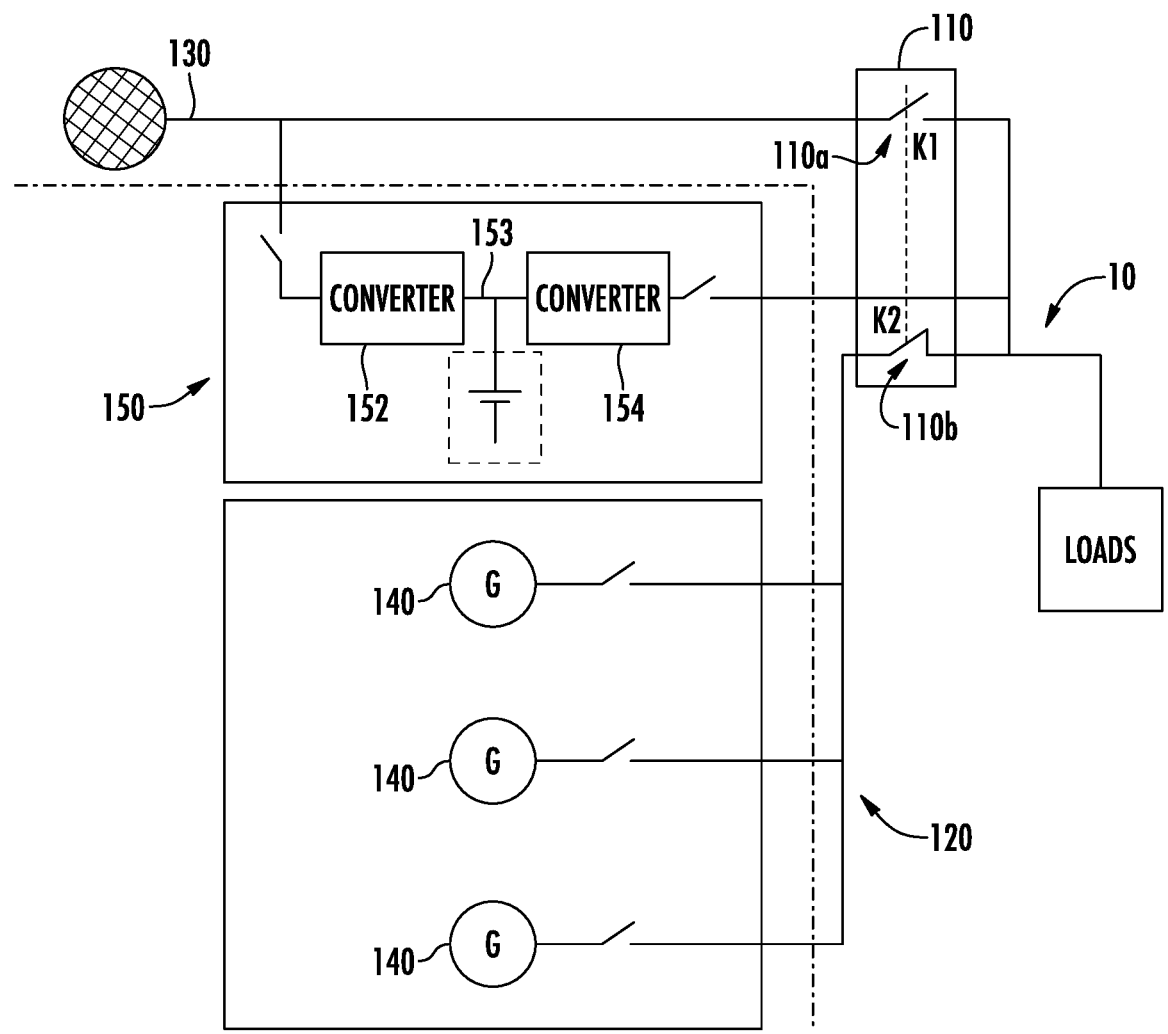
FIG. 6 illustrates the system of FIG. 1 with additional energy storage.

FIG. 6 illustrates a similar configuration except energy storage has been added at the DC link 153 between the SSG converters 152, 154, either directly or via a DC/DC converter (not shown). The energy storage may include ultra-capacitors, electro-chemical storage or a combination of both. This configuration can be used to buffer load transients seen by the grid 130 and/or the DG assets 140, especially if the load steps are asynchronous or repetitive and 5-30% in magnitude.

Figure 7:
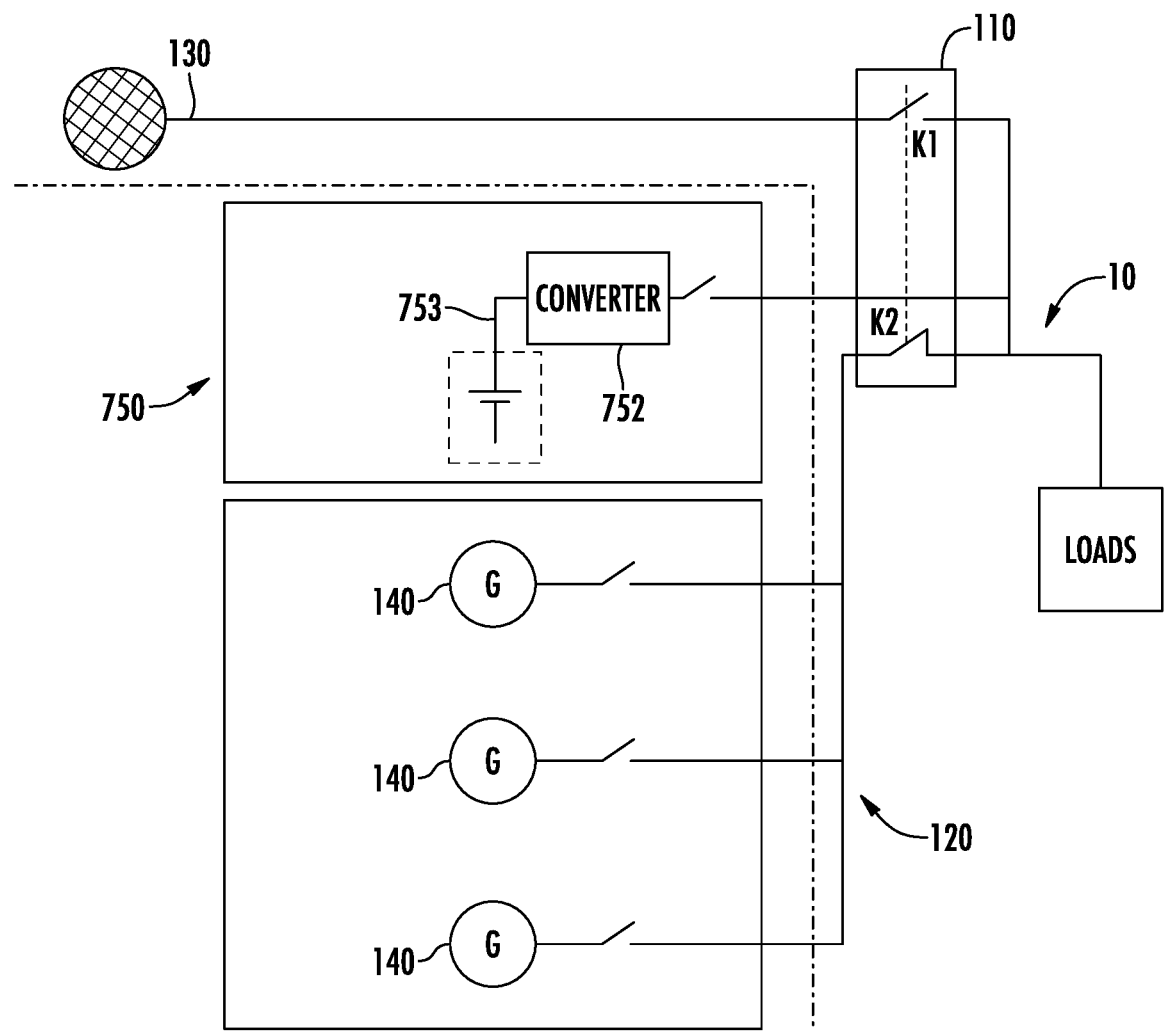
FIG. 7 is a schematic diagram illustrating a soft grid interconnection system according to some embodiments.

FIG. 7 illustrates a variation of the system of FIG. 6, where an SSG 750 comprises a 4-quadrant converter 752 configured to be connected to the load bus 10. In this configuration, electrochemical storage (e.g., a battery) may be connected to a DC link 753 of the SSG 750, directly or via a DC/DC converter (not shown). This configuration may be desirable if the load steps are asynchronous or repetitive and 30-100% in magnitude. This variation would enable provision of a 100% island grid system with maximum power quality and energy efficiency.

Figure 2:
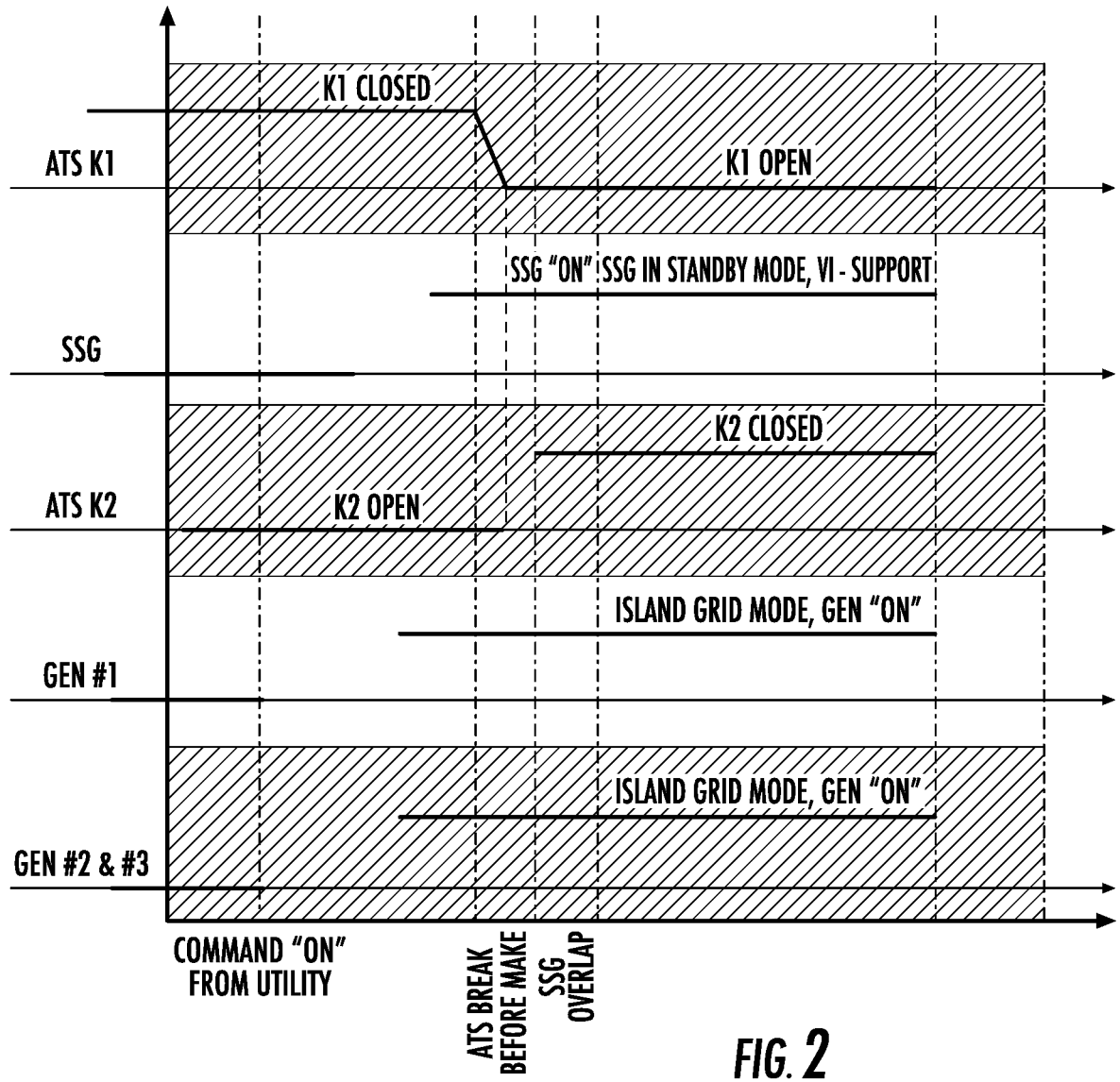
FIGS. 2-4 illustrate example operations of the system of FIG. 1.
Figure 3:
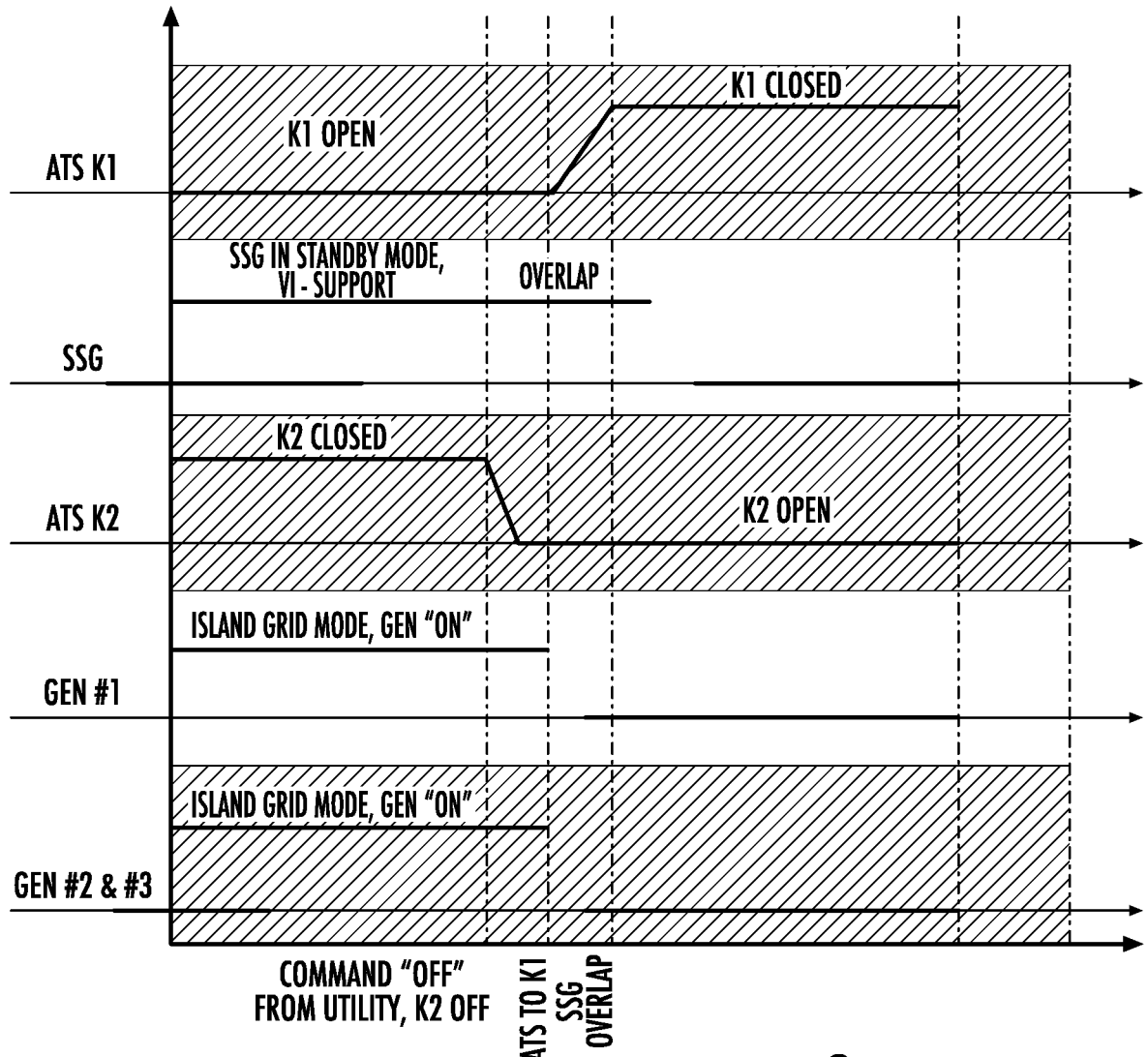
Figure 4:
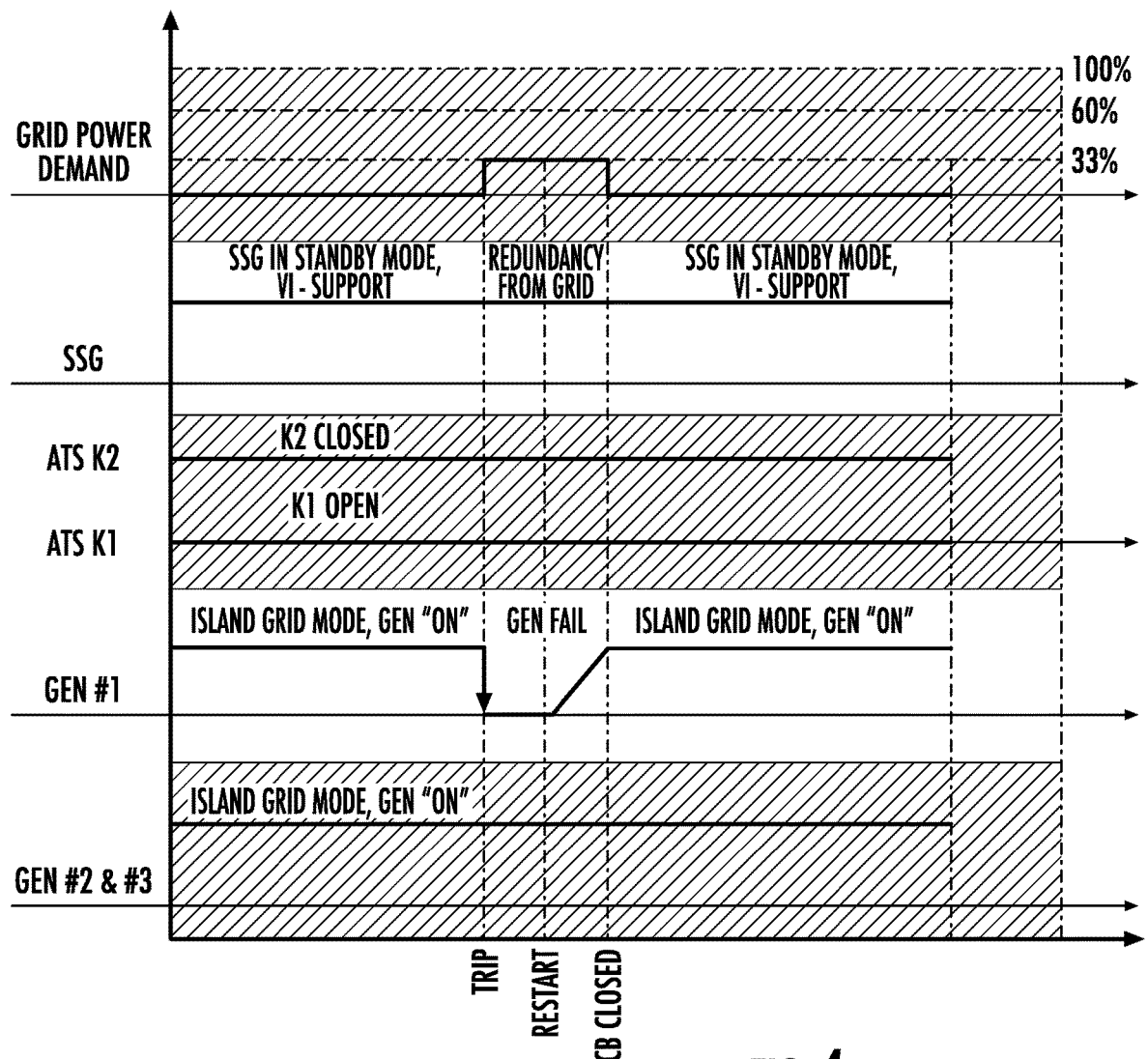

FIGS. 2, 3, and 4 illustrate the three modes of operation of the system of FIG. 1. FIG. 2 shows a transfer of the load from the grid 130 to the DG assets 140. A command is received from the utility to shed load or conversely transfer the load to one or more of the DG assets 140. The SSG 150 starts and is placed in standby mode, in a voltage/current (VI) support mode that provides voltage and transient load response support. The one or more DG assets 140 are started and are synchronized to the grid 130. The SSG 150 starts supplying the loads using the grid 130 as a source. The ATS 110 is commanded to switch, resulting in the disconnection of the grid 130 from the load bus 10. During this time, the SSG 150 supports the load, since the second pole 110b of the ATS 110 has not closed. The ATS 110 finally closes the second pole 110b, connecting the common line 120 to the output of the SSG 150. Once the connection is made, the SSG 150 ramps down its output power as the one or more DG assets 140 ramp up power supporting the load. After the SSG 150 has transferred all the load support to the one or more DG assets 140, the SSG 150 is placed in a standby, voltage and current (VI) support mode.

FIG. 3 illustrates transfer of the load from one or more of the DG assets 140 to the grid 130. A command is received from the utility indicating that the load can be supported by the grid 130. The SSG 150 starts loading the grid 130 and supplying power to the load. As the grid loading is ramped up, the loading of the one or more DG assets 140 is ramped down until the load power comes from only from the grid 130. The ATS 110 is commanded to transfer the load from the one or more DG assets 140 to the grid 130. The ATS 110 first disconnects the common line 120 from the load bus 10 and the SSG 150 supports the load. Thereafter, the ATS 110 connects the grid 130 to the load and power output of the SSG 150 is reduced as the grid 130 assumes the load directly. After the transfer is complete, the SSG 150 and the one or more DG assets 140 may be turned off.

FIG. 4 illustrates operations to support the load in the event one or more of the DG assets 140 fails or trips offline when load is supported by the one or more DG assets 140. As described above, the SSG 150 is operating in standby, VI support mode. When the one or more DG assets 140 becomes unavailable, the SSG 150 nearly instantaneously provides power from the grid 130 to replace power that was lost by the loss of the one or more DG assets 140. The SSG 150 can continue supplying power to the load from the grid 130 or may retransfer the load back to the one or more DG assets 140 if restored or to a replacement one or more of the DG assets 140. The replacement DG asset(s) 140 may be ready and connected to the common line 120, so the SSG 150 can transfer the load to the replacement DG asset(s) by reducing the power taken from the grid 130. When power received from the grid reaches zero, the SSG 150 can resume operation in standby, VI support mode.

Figure 5:
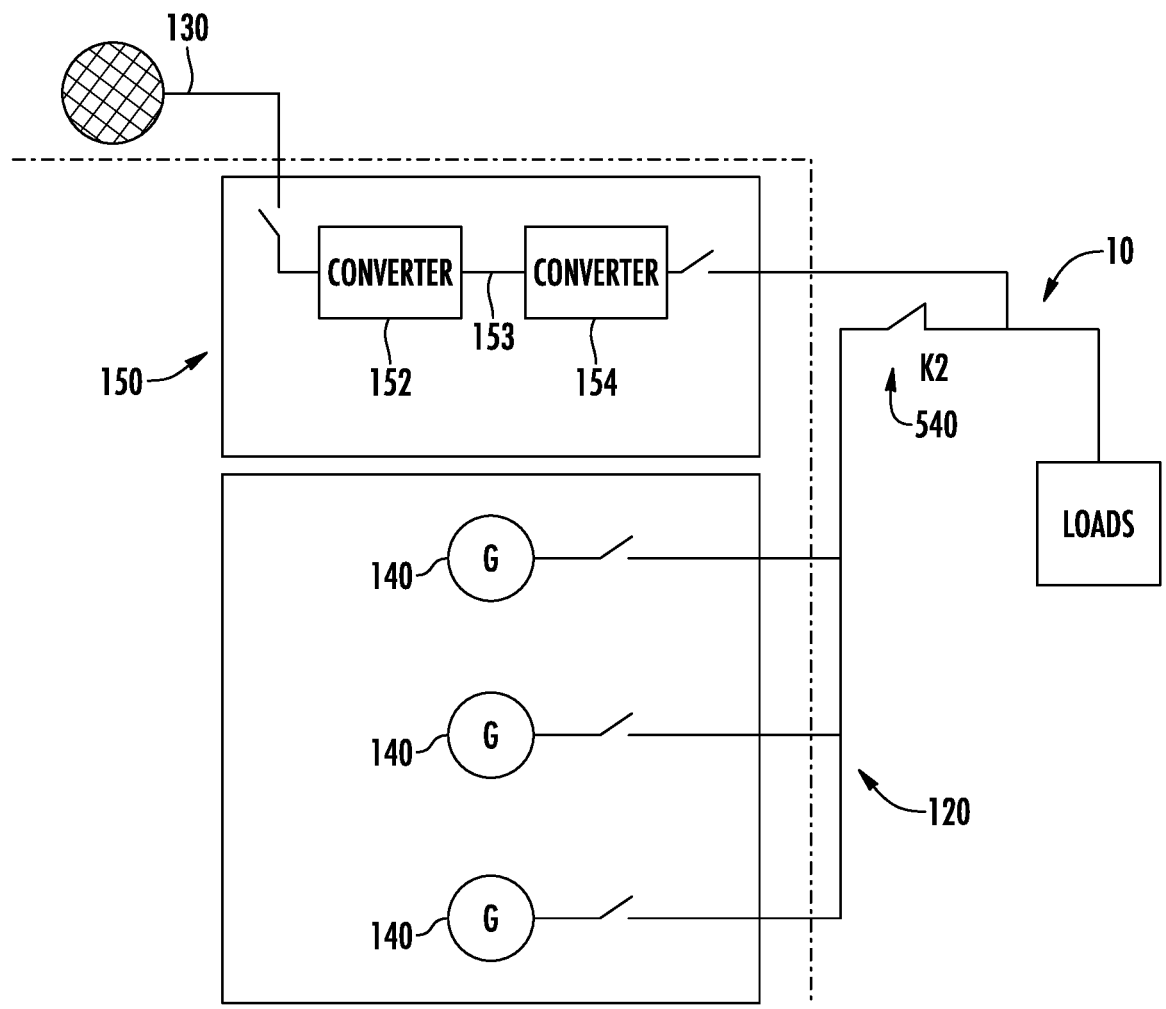
FIG. 5 is a schematic diagram illustrating a soft grid interconnection system according to some embodiments.

FIG. 5 illustrates a weak grid condition wherein the grid 130 cannot alone support the load. In this case, the DG assets 140 may be the primary power source for the load and the SSG 150 stabilizes the island grid frequency. Although the grid 130 cannot support the entire load, it can provide redundancy for the DG assets 140 by providing power from the grid 130 via the soft grid connection system. The SSG 150 draws power from the grid 130 and supplies it to the load bus 10. In this configuration, the grid 130 is not paralleled with the common line 120 (which is coupled to the load bus 10 via a switch 540), although the grid 130 can supply power on as needed basis up to the grid capability limit. This operational mode allows for redundancy if one or more of the DG assets 140 are removed, as the missing power to satisfy the load requirements will be supplied by the grid 130 through the SSG 150. The SSG 150 provides a method to prevent DG export to the grid.

In the above cases, there is no export of power to the grid 130. However, in some modes, the SSG 150 could export power to the grid 130 and may not exceed the original incoming power line short circuit rating (AIC) because of the current limiting capability of the SSG 150.

Figure 8:
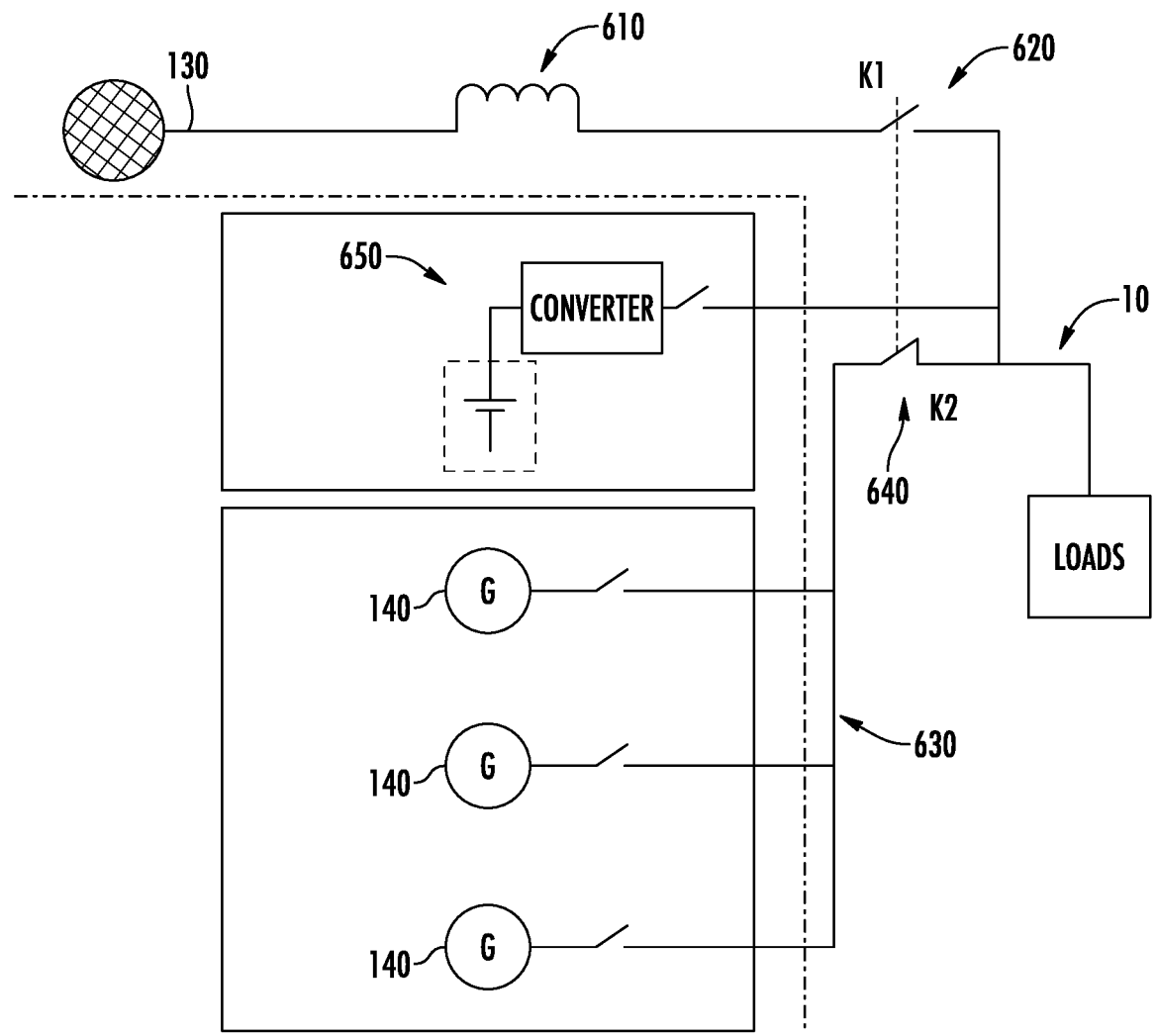
FIG. 8 is a schematic diagram illustrating a soft grid interconnection system with a current-limiting impedance according to some embodiments.

As discussed earlier, a concern of the utilities is the change in fault current dynamics with the addition of a DG asset close to the last legs of the existing distribution. This concern can be mitigated if the available fault current remains at the same level before and after the addition of the DG installation. FIG. 8 shows an arrangement similar to that of FIG. 1, but with a coupling impedance (inductor) 610 placed between the grid 130 and load bus 10 when a first switch 620 (K1) is closed. The impedance 610 is sized to limit the fault current to the desired level (e.g., the impedance pre-DG installation). The load bus 10 remains synchronized with the grid 130.

Power flow between the grid 130 and the load bus 10 can be controlled by controlling the voltage phase angle between them and the VAR magnitude between the sources may be controlled by adjusting the amplitude difference. With two sources of similar amplitudes and the first switch 620 (K1) and the second switch 640 (K2) closed, power can flow from the grid 130 and DG common line 630 can be controlled by adjusting the phase angle of the load bus 10 to lag the grid 130, i.e., increasing the lag will increase the magnitude of power flowing from the grid 130 to the load bus 10. Conversely, adjusting the phase angle of the load bus 10 to lead the grid 130 will cause power to flow from the load bus 10 to the grid 130, i.e., increasing the lead will increase the amount of power flowing from the DG load bus 10 to the grid 130. When the phase angle is zero, there is no power flow between the two sources. The capability of the topology also extends to control of the volt-amperes reactive (VARs) that are exchanged between the two sources. If the amplitude of voltage on the load bus 10 is increased in relation to the amplitude of the voltage on the grid 130, it will result in leading VARs and conversely, if the amplitude of the voltage on the load bus 10 is lowered with respect to the amplitude of the voltage on the grid 130, the VARs will be lagging.

In the system illustrated in FIG. 8, the grid 130 is connected to a first terminal of coupling impedance 610 and the second terminal of the coupling impedance is connected to the first switch 620 (K1). The soft grid connection system can include a SSG system 650 having a bidirectional first and second converters coupled via DC link or just a bidirectional converter coupled to a DC link (e.g., similar to soft grid connection configurations in FIGS. 6 and 7, respectively). DG assets 140 are coupled to a common line 630 and a second switch 640 (K2). In a first mode, the second switch 640 (K2) is closed and the DG assets 140 support the load. The SSG 650 is operated in VI support mode wherein the SSG 650 controls the frequency of the load bus 10. The grid 130 can be coupled to the load bus 10 by having the SSG 650 synchronize the load bus 10 to the grid 130 and then closing the first switch 620 (K1). The SSG 650 can adjust the phase angle between the grid and the load bus to either export or import power from the grid 130. As discussed above, the magnitude of power is controlled by the adjustment of the phase angle between the two sources. In this mode, the quality of the load bus 10 can be controlled by maintaining the load bus 10 voltage independently of the grid voltage. The power is either delivered to or taken from the grid 130 independent of the magnitude of the grid voltage. The difference in voltage magnitude between the two sources results in VARs exchanged.

In a mode in which the DG assets 140 are disconnected, the SSG 650 can continue to support the load bus 10. As long as the SSG 650 controls the voltage and phase angle with respect to the grid 130, power will be taken from the grid 130 to support the load. The SSG 650 can also provide transient support for step loads that may be encountered. It is also possible to power the load directly by the grid 130 without the SSG 650 operating. This can be accomplished by shorting out the coupling impedance 610 using a switch that bypasses the impedance 610, which can avoid a drop in the voltage as a result of the line impedance 610. Similar to variations illustrated in FIGS. 6 and 7, this configuration can include an SSG with two converters and an energy store or an SSG with only one converter and an energy store.

In this line interactive operating mode, the SSG operation will condition the load by providing voltage support and transient load response. With the impedance between the two sources, the fault current available at the grid connection will be controlled. It can be arranged that the first switch 620 (K1) be opened after number of fault cycles. When the first switch 620 (K1) is opened, the two sources will be isolated.

What is claimed:

1. A system comprising:
   a break-before-make automatic transfer switch (ATS) configured to selectively couple a utility grid and at least one distributed generator to a load bus such that, in a state transition of the ATS, the utility grid and the at least one distributed generator are both disconnected from the load bus before the utility grid or the at least one distributed generator is connected to the load bus; and
   at least one converter configured to be coupled to the load bus and configured to provide power to the load bus during the state transition of the ATS, wherein the at least one converter is configured to commence providing power to the load bus before the state transition when the utility grid is connected to the load bus via the ATS, to continue providing power to the load bus through the state transition, and to gradually cease providing power to the load bus after the state transition when the at least one distributed generator is connected to the load bus via the ATS.

2. The system of claim 1, wherein the at least one converter is configured to provide power to the load bus from the utility grid during the state transition of the ATS.

3. The system of claim 2, wherein the at least one converter comprises:
   a first converter having a first port configured to be coupled to the utility grid; and
   a second converter having a first port coupled to a second port of the first converter by a DC bus and a second port configured to be coupled to the load bus.

4. The system of claim 3, wherein the first and second converters are bidirectional and support transfer of power from the at least one distributed generator to the utility grid.

5. The system of claim 1, wherein the at least one converter is configured to provide power to the load bus from an energy storage device during the state transition of the ATS.

6. The system of claim 1, wherein the at least one generator comprises a plurality of distributed generators coupled to the ATS by a common bus.

7. The system of claim 1, wherein the at least one converter is bidirectional and supports transfer of power from the at least one distributed generator to the utility grid.

8. The system of claim 1, wherein the at least one converter is further configured to provide power to the load responsive to an unavailability of the at least one distributed generator after the state transition.

9. A system comprising:
   a break-before-make automatic transfer switch (ATS) configured to selectively couple a utility grid and at least one distributed generator to a load bus such that, in a state transition of the ATS, the utility grid and the at least one distributed generator are both disconnected from the load bus before the utility grid or the at least one distributed generator is connected to the load bus; and
   least one converter configured to be coupled to the load bus and configured to provide power to the load bus during the state transition of the ATS, wherein the at least one converter is configured to commence providing power to the load bus before the state transition while the at least one distributed generator is connected to the load bus via the ATS, to continue providing power to the load bus through the state transition, and to gradually cease providing power to the load bus after the state transition when the utility grid is connected to the load bus via the ATS.

10. A method comprising:
    operating a break-before-make automatic transfer switch (ATS) that is configured to selectively couple a utility grid and at least one distributed generator to a load bus to provide a state transition in which the utility grid and the at least one distributed generator are both disconnected from the load bus before the utility grid or the at least one distributed generator is connected to the load bus; and
    operating at least one converter coupled to the load bus to provide power to the load bus during the state transition of the ATS, comprising:
    commencing provision of power to the load bus using the at least one converter before the state transition when the utility grid is connected to the load bus via the ATS;
    providing power to the load bus using the at least one converter through the state transition; and
    gradually ceasing provision of power to the load bus using the at least one converter after the state transition when the at least one distributed generator is connected to the load bus via the ATS.

11. The method of claim 10, further comprising providing power to the load using the at least one converter in the event of an unavailability of the at least one distributed generator after the state transition.

12. A method comprising:

operating a break-before-make automatic transfer switch (ATS) that is configured to selectively couple a utility grid and at least one distributed generator to a load bus to provide a state transition in which the utility grid and the at least one distributed generator are both disconnected from the load bus before the utility grid or the at least one distributed generator is connected to the load bus; and operating at least one converter coupled to the load bus to provide power to the load bus during the state transition of the ATS, comprising:

commencing provision of power to the load bus using the at least one converter before the state transition while the at least one distributed generator is connected to the load bus via the ATS;

providing power to the load bus using the at least one converter through the state transition; and gradually ceasing provision of power to the load bus using the at least one converter after the state transition when the utility grid is connected to the load bus via the ATS.

13. A system comprising:

a first switch configured to couple a utility grid to a load bus via an inductor;

a second switch configured to be coupled at least one distributed generator to the load bus; and at least one converter configured to be coupled to the load bus and configured to provide power thereto to support a first mode in which the first and second switches are closed, a second mode in which the first switch is open and the second switch is closed and a third mode in which the first switch is closed and the second switch is open, wherein the at least one converter is configured to provide voltage and transient load response support in the second and third modes.

14. The system of claim 13, wherein the at least one converter is configured to support bidirectional power transfers between the utility grid and the load bus in the first mode.

* * * * *

UNITED STATES PATENT AND TRADEMARK OFFICE
CERTIFICATE OF CORRECTION

PATENT NO. : 11,362,519 B2
APPLICATION NO. : 17/048461
DATED : June 14, 2022
INVENTOR(S) : Taimela et al.

It is certified that error appears in the above-identified patent and that said Letters Patent is hereby corrected as shown below:

In the Specification

Column 2, Line 17: Please correct "to e load" to read -- to the load --

Signed and Sealed this
Sixth Day of September, 2022

Katherine Kelly Vidal
*Director of the United States Patent and Trademark Office*